United States Patent [19]
Dahle

[11] 3,782,187
[45] Jan. 1, 1974

[54] MAGNETO-ELASTIC TRANSDUCER FOR FORCE MEASUREMENT

[75] Inventor: Orvar Dahle, Vasteras, Sweden

[73] Assignee: Allmanna Svenska Elektriska Aktiebolaget, Vasteras, Sweden

[22] Filed: Jan. 20, 1972

[21] Appl. No.: 219,395

Related U.S. Application Data

[63] Continuation-in-part of Ser. No. 881,550, Dec. 1, 1969, abandoned.

[30] Foreign Application Priority Data
Dec. 9, 1968 Sweden.............................. 16782/68

[52] U.S. Cl. ........................... 73/141 A, 73/DIG. 2
[51] Int. Cl. ............................................. G01l 1/12
[58] Field of Search ..................... 73/DIG. 2, 141 A; 336/20; 310/26; 148/120, 121, 122

[56] References Cited
UNITED STATES PATENTS

| | | | |
|---|---|---|---|
| 1,906,551 | 1/1930 | De Forest | 73/DIG. 2 |
| 1,987,468 | 1/1935 | Dahl et al. | 148/120 |
| 2,801,942 | 8/1957 | Nachman | 148/2 |
| 2,895,332 | 7/1959 | Dahle et al. | 73/141 A |
| 3,188,250 | 6/1965 | Holbein et al. | 148/120 |
| 3,189,493 | 6/1965 | Chen | 148/120 |
| 3,271,204 | 9/1966 | Glass | 148/120 |
| 3,340,729 | 9/1967 | Scoppe | 73/DIG. 2 |
| 3,511,639 | 5/1970 | Chin et al. | 148/121 X |

Primary Examiner—Charles A. Ruehl
Attorney—Jennings Bailey, Jr.

[57] ABSTRACT

A magneto-elastic transducer for measuring mechanical forces is constituted by a laminated core of magneto-strictive sheet metal with tubular channels containing excitation and measuring windings. The sheet metal at least in the operative measuring zone of the transducer has residual mechanical stresses, the average value of the magnitude of these stresses being at least of the same order as the magnitude of the stresses induced in the measuring zone when the transducer is subjected to its rated load.

The residual stresses may be produced by heat treatment, cold rolling, drawing, bending, pressing, blasting, radiation or martensite formation.

4 Claims, 18 Drawing Figures

F/G.3a

MAGNETO-ELASTIC TRANSDUCER FOR FORCE MEASUREMENT

RELATED APPLICATIONS

The application is a continuation-in-part application of Ser. No. 881,550, filed Dec. 1, 1969, now abandoned.

BACKGROUND OF THE INVENTION

1. Field of the Invention

The invention relates to magneto-elastic transducers for force measuring.

2. The Prior Art

In a common class of magneto-elastic force transducers, a load-supporting magnetic core is built up of magneto-strictive sheet metal, and excitation and measuring windings are inserted in tubular channels in the core. The magneto-strictive sheet metal normally consists of some type of hot-rolled or cold-rolled transformer material which has been soft-annealed in order to achieve the best possible magnetic properties. For magneto-elastic transducers manufactured from such material, a more or less non-linear relation is always obtained between output voltage and load. This relation (the so-called characteristic curve) is influenced by many factors, among others the magnitude of the excitation current and the electrical loading of the measuring (secondary) winding. By suitable adjustment of these factors it is usually possible to achieve an S-shaped characteristic with the point of inflection more or less centered in the load range of interest and in this way acceptable linearity can be achieved, although at the price of a severe limitation of the measuring range. This has the disadvantage that the load-bearing area of the transducer must be many times greater than is necessary from strength considerations, and also that load-in-dependent errors, as for instance zero-point shifts due to temperature, differences in line voltage and frequency changes, will have relatively much greater significance, so that a compromise must be struck which puts practical limits to the linearity achievable in this way.

It is also found that the manufacturing reproducibility of these transducers is generally poor, so that the linearity-controlling factors have to be adjusted individually for every unit, and a considerable proportion of the transducers produced cannot be brought to acceptable linearity at all and have to be scrapped. This tends to make the production of these transducers rather costly.

SUMMARY OF THE INVENTION

The present invention relates to magneto-elastic transducers displaying greatly improved linearity in relation to the extent of the measuring range, by means of a practical combination of elementary parts with different mechanical stresses. According to the invention the sheet metal in the core is treated in such a way that residual mechanical stresses exist in it. The average value of the magnitude of the residual stresses, at least in the operative measuring zone of the transducer, should be of at least the same order as the magnitude of the stresses caused in said zone when full load is applied to the transducer.

BRIEF DESCRIPTION OF THE DRAWINGS

The invention will be described in the following with reference to the accompanying drawings where

FIGS. 3a and 3b show a different type of core, as do FIGS. 4a and 4b.

FIELD OF APPLICATION OF THE INVENTION

The invention can be applied to all magneto-elastic transducers in which the force-sening magnetic core is built from sheet-metal laminations.

DESCRIPTION OF THE PREFERRED EMBODIMENTS

FIGS. 1 through 6 show a number of configurations of such transducers. FIG. 1a shows a core of a well-known type, and FIG. 1b the winding arrangement in the core. FIGS. 1c – d show in principle the magnetic flux distributions in an unloaded core and in a core subjected to an axial force.

The transducer functions briefly as follows.

Figure 1A:
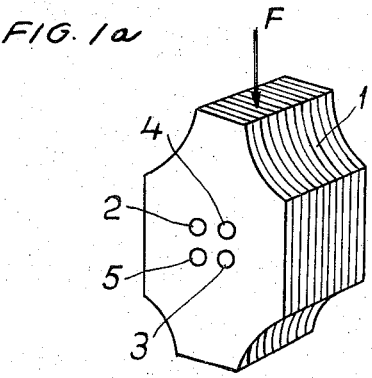
FIGS. 1a to 1d show the principle of a magneto-elastic transducer.
Figure 1B:
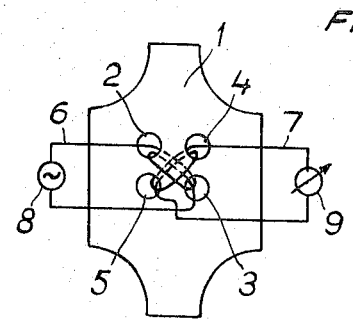
Figure 1C:
Figure 1D:
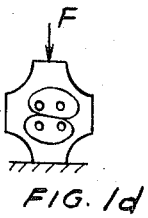

There are four holes 2, 3, 4 and 5 in the core. A winding 6 is arranged in the holes 2 and 3 and connected to an alternating voltage source 8. The current in the winding 6 generates a magnetic flux around the holes in the core. A second winding 7 is inserted in the holes 4 and 5 and this winding is connected to a measuring device 9. If the core 1 is not influenced by mechanical forces, the flux is symmetrical in a region around and between the holes and no voltage is induced in the winding 7 (FIG. 1c). When the core is subjected to a mechanical force, the flux is deformed and a voltage induced in the winding 7 so that the measuring device 9 gives a reading (FIG. 1d). The region between the holes, where the major portion of the magneto-motive force generated by the excitation current is expended, is called the measuring zone.

Figure 2A:
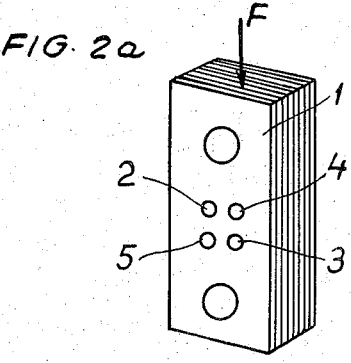
FIGS. 2a, 2b and 2c show modified formations of a core to be utilized in the same way as that of FIG. 1.
Figure 2B:
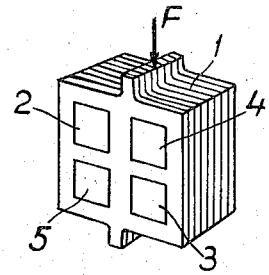
Figure 2C:
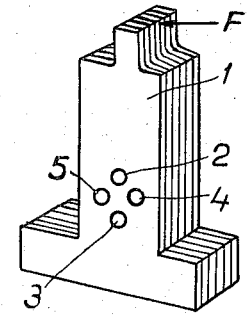

The transducer cores represented in FIGS. 2a – 2c all utilize the same basic principle as described above, that is, crossed windings are provided in the holes.

In the modification of FIG. 2a, there are provided openings in the block or core above and below the openings 2 – 5 to permit deformation of the block in certain particular ways. The openings in FIG. 2b are rectangular in cross-section, thus providing relatively narrow legs between them. FIG. 2c shows an arrangement for measuring a lateral force, the base of the block being securely fixed and the force exerted in the direction of the arrow F at the top of the block.

Figure 3B:
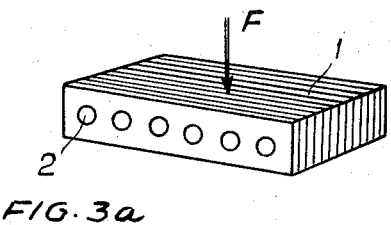
Figure 3B:
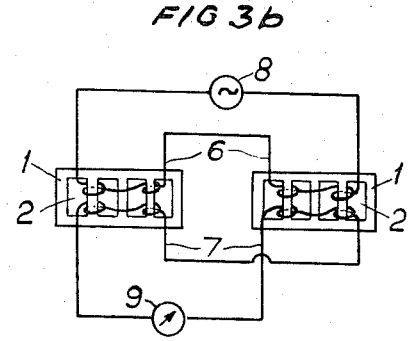

The transducer according to FIG. 3 represents a slightly different principle. The core 1 is flat and wide and provided with a number of parallel tubular or rectangular channels 2, in which two parallel windings are arranged. The transducer is paired with a second transducer of the same type and the windings interconnected according to FIG. 3b. One winding 6 of each transducer, designated as the primary, is series connected to alternating current source 8. The remaining windings 7, designated as secondary or measuring windings, are connected in series-opposition to measuring device 9. When the transducer cores are mechanically unloaded, the voltages of the secondary windings will balance each other and the voltage indicated by the measuring device will be zero. When one of the transducer cores is subjected to a compressive force, its magnetic reluctance will increase, and the flux through the windings decrease correspondingly, resulting in a decreased output voltage from the secondary winding. The change in voltage appears as an unbalance voltage on the measuring device, representing the force. If both transducer cores are subjected to forces, the unbalance voltage will be a function of the force difference.

At first glance it would seem that this working principle is completely different from the one described for the transducer according to FIG. 1. A close analysis reveals that it is not so. In both cases, the basic principle is a comparison between the reluctance of two magnetic paths which are differently influenced by the force one wants to measure. The main distinction is that in the transducer according to FIG. 1 these two magnetic paths are contained in the same core, while in the other case they are formed in two separate cores.

Figure 4A:
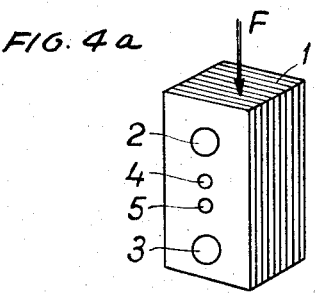
Figure 4B:
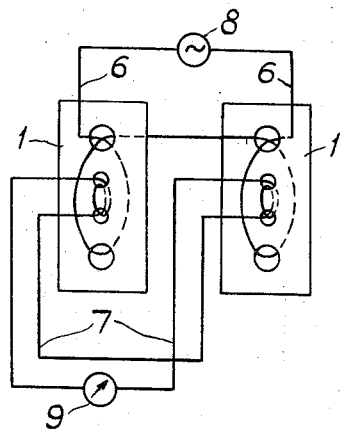

The transducer according to FIG. 4 is mechanically different from the one according to FIG. 3, but the function is quite similar. Again, it is necessary to use two equal transducer cores and balance their output voltages against each other. The secondary windings 7 are arranged in channels 4,5 separate from the primary windings in channels 2,3, so that they sense only a part of the magnetic flux.

The transducers according to FIGS. 5 and 6 are intermediate in working principle to transducers according to FIGS. 1 and 3, in that the magnetic paths, the reluctance of which are to be compared, are contained in the same transducer core, while the fluxes of either path are sensed by separate windings, which are then connected in series opposition in such a way that the resulting output voltage represents the unbalance between the fluxes.

Figure 5A:
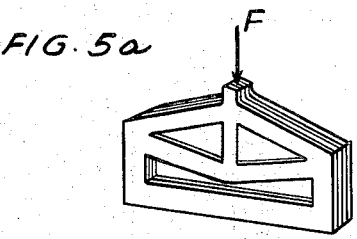
FIGS. 5a and 5b and FIGS. 6a and 6b show transducers provided with legs around which the coils are wound.
Figure 5B:
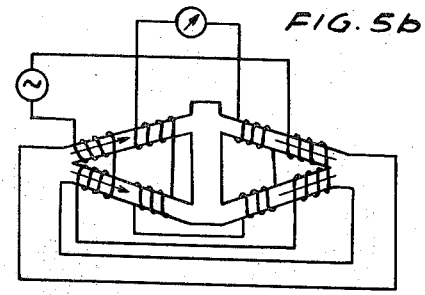

In the form of FIGS. 5a and 5b, the frame 1' has upwardly directed legs from which are inwardly diverging legs 12, 13, 14 and 15 each of which is surrounded by a flux inducing winding and a measuring winding.

Figure 6A:
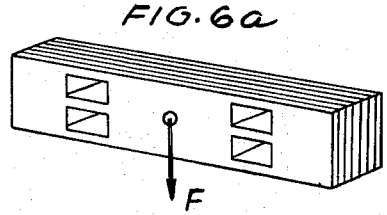
Figure 6B:
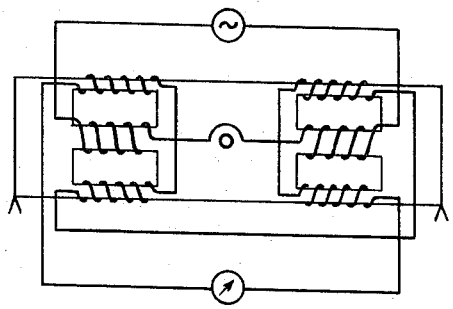

In the form of FIGS. 6a and 6b, a single block has spaced pairs of openings therethrough with comparatively thin legs between them and between them and the outside of the block, the intermediate legs being surrounded for instance by the flux inducing coils and the outer legs by the measuring coils.

In these forms, the measuring areas are basically the leg portions which are surrounded by the measuring coils.

PRINCIPLE OF THE INVENTION

For convenience, the following discussion refers primarily to the transducer configuration according to FIG. 1. It can be easily generalized to other configurations, however.

Figure 7:
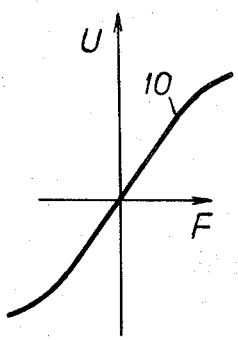
FIGS. 7, 8 and 9 show the output voltage U of the transducer as a function of the superimposed pressure F for various different cases which will be described in more detail later.

FIG. 7 shows an ideal relationship between the output voltage and the load for a transducer in accordance with the above, where the relationship has the shape of a single-curved characteristic 10 for each force direction.

If a transducer with such a characteristic by some means is provided with a prestress over the measuring zone, the effect will be to shift the intersection of the characteristic with the load coordinate axis to the left or to the right, depending on the sign of the prestress. Initial anisotropy in the core material will have the effect of shifting the characteristic vertically. Both prestress and anisotropy will in practice be present, the latter being inherent in rolled material, the former being produced by the deformations attendant on the punching process. In combination these effects give the typical characteristic of a real transducer, where the inflection point of the curve is displaced from the origin. The amount of displacement will depend on, among other things, the excitation current, which at least partly explains the above mentioned possibility of adjusting the shape of the characteristic in the desired measuring range. It should be noted, however, that the basic curvature of the characteristic cannot be influenced by this means.

Figure 8:
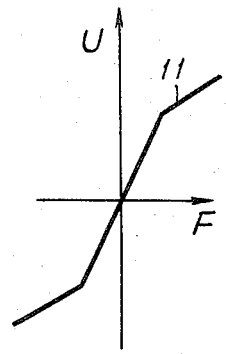
Figure 9:
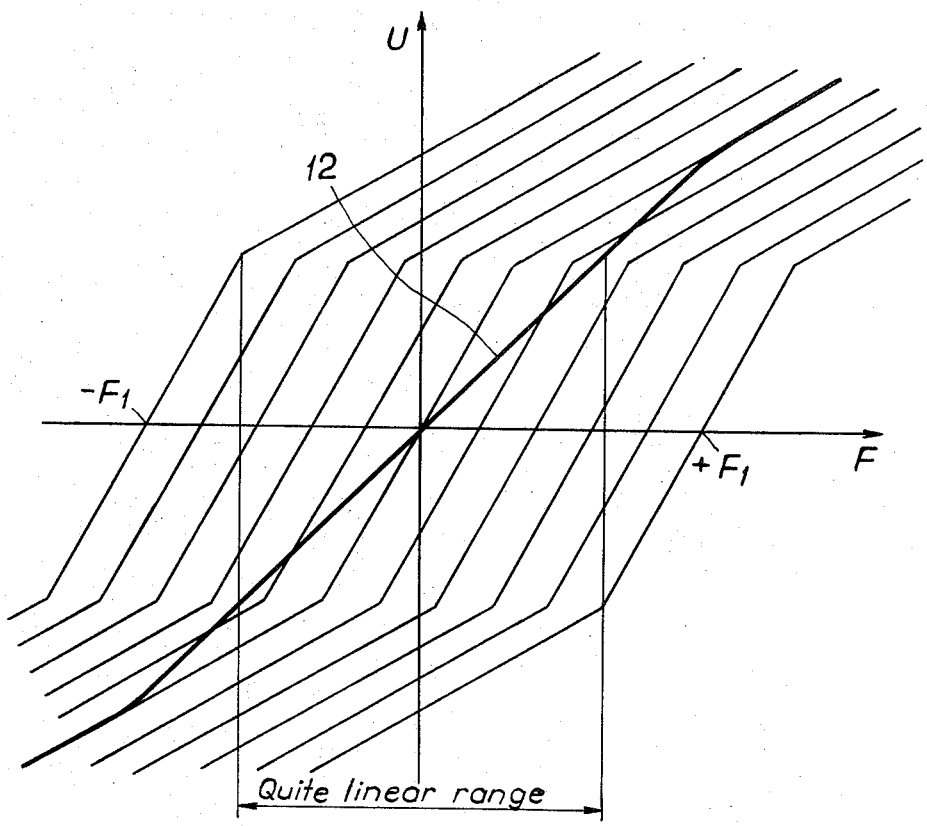

Returning to the ideal case, FIG. 8 shows a characteristic 11 composed of straight line elements, which is an approximation of the characteristic 10. FIG. 9 shows a group of characteristics in which the individual characteristics have the same form as in FIG. 8, but which have zero-points lying equally distributed between $-F_1$ and $+F_1$. Physically this corresponds, for example, to a transducer where the individual sheets have been given different tensile and compressive prestress. The combined characteristic for such a transducer, obtained by a simple addition of the partial characteristics, is reflected in FIG. 9 by the heavy characteristic 12. The completely linear region will in this case be almost twice as large as that of the elementary characteristic, and it has a sensitivity which is between the sensitivities of the steep and flat parts of the elementary characteristic. Although the elementary characteristic has been represented in simplified form as a characteristic with sharp bending points, it can be seen that the total characteristic has very smooth transitions between the completely linear region in the middle and the likewise linear outer parts with a sensitivity equal to the flat parts of the elementary characteristic.

From a manufacturing point of view, it would however, be much too complicated to provide an even distribution of tensile and compressive prestress by combining differently prestressed sheet metal elements when assembling the laminated stack to form a transducer. According to the invention, a corresponding effect is achieved for each separate sheet metal element by giving the material a suitable distribution of residual stresses, at least in the parts of the elements that contribute significantly to the output voltage, that is, in the measuring zone, as defined above. These stresses may either vary randomly in magnitude, sign and direction, or they may form a laminar pattern with predominantly compressive stress in the surface layers and tensile stress in the middle layer of the sheet, or vice versa, the state of stress changing smoothly from one sign to the other in the intermediate layers, or the stress distribution may be a combination of the random and laminar patterns.

METHODS OF IMPLEMENTING THE INVENTION

Residual stresses are commonly divided into three classes:

1. first order of macrostresses, which in a macroscopic region (that is, a volume containing a large number of crystallites) are essentially constant or vary according to the laws of mechanics and elasticity theory;

2. second order or microstresses, which change appreciably in sign and magnitude between neighboring crystallites;

3. Third order or lattic stresses, which may change considerably over distances of several hundred lattice constants.

The punching prestress mentioned previously is a typical macrostress, caused by the deformation in the measuring zone relative to more distant and essentially non-deformed parts of the sheet metal element. Basically, the region around the holes is expanded in the plane of the sheet, which expansion however, is constrained by the surrounding parts, giving rise to radially directed compressive stresses in the center of the element and circumferential tensile stress in the peripheral parts. The stress pattern is complicated however, by the shape of the element giving different stiffness in different directions.

Another type of macrostress is represented by the laminar pattern described above. Such a pattern may be generated by nitriding or case hardening. These processes cause a volume expansion of the surface layer, which places this layer in compression and the interior in tension. A similar effect is caused by some surface working methods, such as grinding, which expand the surface layer in the plane of the surface.

Second-order stresses arise during coldworking, because the strength of crystallites is different in different crystal directions. Adjacent crystallities will therefore have different yield points, and, after removal of a flow-causing load, stresses will be set up between crystallites that have been deformed and crystallities that have maintained their shape.

Second-order stresses can also be caused by martensite formation during tempering of steel and by precipitates in alloys.

Third-order stresses are mostly due to lattice defects, particularly dislocations. Very finely dispersed precipitates can also contribute.

The classification of a particular stress pattern as macro- or micro-stresses is of course rather subjective. Particularly the laminar stress pattern, due for example to nitriding, represents a borderline case, as the stress variations are rather small in the plane of the sheet, but very large over a small distance in the perpendicular direction. The demarcation between second- and third-order stresses is also rather arbitrary, and in the following the term microstresses is understood to include both second- and third-order classes.

All classes of residual stresses can be exploited to achieve linearity improvement of the transducer characteristic. To a certain extent the linearization effect described above has always been present, because the natural way of producing the sheet metal elements is by punching, which produces both macrostresses, as described previously, and microstresses, through coldworking of the hole edges. Indeed, it was attempts to improve transducer properties by eliminating the punching stresses that led to the theory of linearization elucidated above.

The punching stresses are however a very inefficient way of achieving linearization. Although the macrostress may contribute a little, due to the fact that the stress magnitude varies over the measuring zone because of the stress-concentrating action of the holes, most of the observed effect probably comes from the microstresses, which reach a considerable amplitude close to the hole edges. X-ray crystallographic investigations show, however, that these stresses do not reach very far from the punched edge; at a distance of 300 – 400 $\mu$m from the edge their magnitude is usually vanishing. The volume of material influenced by the microstresses is therefore only a small fraction of the measuring zone, and the linearization effect is correspondingly small, generally too small.

The most serious disadvantage with relying on the punching stresses to give the transducers acceptable linearity, however, is that the punching process is very difficult to control. The microstresses depend critically on the wear of the tools, on the alignment between punch and die, on the surface condition of the sheet material and on several other factors, most of which are extremely difficult to bring under close control. It has in fact been proved that the variations in punching stresses are the chief source of bad reproducibility in manufacturing the conventional transducers.

By providing a high and reasonably homogenous level of randomly varying microstresses in the sheet metal elements, a much higher degree of linearization effect can be achieved than is possible with the punching stresses. Moreover, if this microstress level is high enough, the effect of the punching stresses will to a large extent be masked, and their detrimental effect on the manufacturing reproducibility be eliminated. It will also be possible to produce the sheet metal elements by other methods than punching, for instance by chemical milling. This was previously impractical, because the punching stresses inadequate as they are, were still necessary to get usable linearity at all.

A random residual-stress distribution can be produced by a variety of methods. Most of these involve coldworking in one way or another, but it is also possible to use martensite formation by tempering of steel, or dispersion hardening methods. Even the third order stresses obtained by nuclear radiation are effective in producing a linearizing effect, although the doses have to be very massive, so that this method is not economically feasible at the present state of technology.

As regards coldworking methods there are in principle two possibilities for attaining an optimum microstress level: Either to start with a soft-annealed material and subject this to a certain carefully controlled degree of coldworking, or to start with a hard, heavily cold-worked material and heat-treat this at lower temperatures than is required to give complete de-stressing. The time-temperature relation is selected so that after heat treatment the material has a residual stress level of the desired size.

Controlled cold-working of soft-annealed materials can be achieved by rolling, by repeating bending in a straightening mill or by drawing, the latter either alone or in combination with rolling or straightening. Other possible methods are pressing, die stamping, sandblasting, shot-peening or embossing.

Most of these methods produce macrostress patterns superimposed on the random microstresses; this is not necessarily a disadvantage though; on the contrary, the macrostresses may in many cases contribute to the linearizing effect. In particular this is true if the macrostress pattern is of the laminar type, as commonly happens. It may in fact be hard to decide in a particular case whether the macro- or microstresses are the most important, for example in the cases of bending, shot peening or embossing, which produces a markedly laminary structure.

It has already been mentioned that a laminar stress pattern, which is equally efficacious as a random stress distribution in creating a linearizing effect, may be conveniently produced by nitriding or case hardening. These methods will however also involve dispersion hardening or tempering effects, so that in these cases too a random microstress pattern will be present.

EXPERIMENTAL INVESTIGATION OF THE INVENTION

Naturally, the theory of linearization described above gives a much simplified picture of what really happens when introducing residual stresses in the transducer material.

Beside the linearizing effect, other properties of the transducers are influenced, as for example magnetizing current requirements, sensitivity, temperature stability, and others. Optimum residual stress levels, which to some extent may depend on the kind of treatment used, can only be determined by empirical methods.

In most experiments performed, rolling has been used for producing residual stresses, this method being convenient to use and easily controlled. The degree of coldworking can in this case be expressed through the reduction, that is the relative elongation of the sheet metal strip caused by the rolling. As starting material as a rule cold-rolled and soft-annealed transformer steel with about 3 percent silicon has been used.

It has been found that a reduction of as little as 1 percent already produces a marked improvement of linearity. As the reduction is increased linearity continues to improve, but beyond 12 percent the linearity improvement is too much offset by the loss of sensitivity, so that nothing is gained by going further. Optimum reduction is found to be between 6 and 12 percent, the final choice being governed by a compromise between various secondary properties, as the exact value is not critical from a linearity point of view.

Most of the experiments have been made on transducers according to FIG. 2a. The optimum material has however also been tested on the configurations according to FIGS. 1, 2b and 3 with equally good results.

Generalizing these results so that they can be applied to other methods of producing the desired stress distributions meets with some difficulties. In the foregOing discussion the expressions "stress magnitude", "stress levels" etc. have been used. Defining these ideas in quantitative terms is not easy, as the concept of stress in a solid body is rather complex.

The state of stress can in general be considered as a super-position of applied stresses, which are induced by forces acting externally on the body, and residual stresses, which remain when all applied forces have been removed. The stress in an internal point is generally different in different directions; moreover, the stress in any particular direction is a vector quantity, which can be resolved into normal stress and shear stress components.

While the applied stresses in any point at least in principle can be computed using the laws of mechanics and elasticity, the residual stresses as a rule cannot be calculated, nor measured directly. Observation is only possible through their physical effects, chief among these the deformations that always accompany the stresses.

Like the stress, the internal strain, that is the relative deformation of a small-volume element, is a vector composed of normal and shear strain components and dependent on the direction considered. The state of strain is related to the state of stress by a number of fairly complicated equations involving the elastic constants of the material (see for example Timoshenko - Goodier: Theory of Elasticity, New York 1951).

The normal strain components manifest themselves by changes in the inter-atomic distances in the solid; that is in the lattice constants of the crystallites, and this offers possibilities of observing the internal strains through X-ray diffractometry (see for example Klug-Alexander: X-Ray Diffraction Procedures, New York 1954). Surface macrostresses can be measured fairly accurately through observations of line shifts in X-ray diffractograms. The microstrains accompanying microstresses naturally cannot be measured individually, as the minimum area that can be resolved is of the order of a few $mm^2$, but a measure of their average magnitude can be obtained through the line-broadening that results from the superposition of reflections from volume elements with different strains. This will also be a measure of the average stress magnitude, although interpretation of the strain measurement in terms of absolute stress magnitude is difficult and of doubtful value in view of the complexity of the equations relating stress to strain. It is still possible to make comparative measurements, however, particularly if it can be assumed that the stress distribution is random, as is usually the case for microstresses.

Although the X-rays only penetrate a few thousand lattice constants into the metal, and therefore essentially measure the state of the surface layer, the interior can be investigated by use of sectioning techniques. In this way it is also possible to examine anisotropic stress distributions. In particular, the average stress magnitude of a laminar stress pattern like the one due to nitriding can be determined by taking diffractograms from a surface cut perpendicular to the plane of the sheets. The strain magnitude determined in this way can be expected to relate to the linearizing effect of the stress pattern in the same way as the strain magnitude for a random stress distribution.

X-ray diffraction measurements of optimally reduced sheet have yielded the interesting result, that the average microstrain magnitude in this material is approximately the same as the strain caused by punching stresses close to the punched edges, when punching holes in soft-annealed sheet of the same composition. In quantitative terms, the measured strain values or levels are about at least 0.1 percent preferably about 0.2 - 0.5 percent, which in the case of punching stresseS refers to a distance of 5 - 25 $\mu m$ from the punched edge, the strain typically decreasing by a factor 2 for each 100 $\mu m$ distance from the edge.

The measurements referred to have been made according to the integral breadth method with Cu-$\alpha$ radiation. Corrections for line-broadening due to the $\alpha$-doublet have been made according to Jones (1938) and for instrumental line-broadening according to Schoening et al. (1952), so that the levels found are corrected levels. The instrumental line-broadening was determined from samples of the annealed base-material, carefully stress-relieved and etched to remove all residual stress from the exposed surface.

It should be observed that the precision of these measurements is not great, and the measured values may also be subject to systematical errors, as the experimental difficulties are considerable, still the comparison between strain levels in different samples should be fairly reliable, and will at least give the right order of magnitude.

While as mentioned the experiments have been made mostly on silicon transformer steel, there are innumerable magnetic alloys that can be used for the transducer core, and there is no reason to believe that the results would be different for these. The basic components of such alloys are the three ferro-magnetic metals iron, nickel and cobolt. Beside alloying these materials, up to 5 percent silicon may be added, up to about 16 percent aluminum and also smaller quantities of manganese, copper, molybdenum and vanadium, as well as non-metallic substances such as carbon, oxygen, nitrogen, sulphur and phosphorus which normally occur in such alloys.

We claim:

1. Magneto-elastic transducer for measuring forces, which transducer comprises a laminated core of magnetostrictive sheet metal with tubular channels basically at right angles to the laminations, an excitation winding connected to an alternating current source and a measuring winding connected to a voltage sensitive device, said windings being mounted in said channels, the sheet metal of said core possessing permanent residual stresses at least in the areas of the laminations where the major part of the magneto-motive force impressed by the excitation current is expended, said stresses being randomly distributed in magnitude, sign and direction, their average magnitude in any part of such areas being of the same order as the average magnitude of the residual stresses caused close to the punched edge when punching holes in soft-annealed sheet metal of the same thickness and basic composition as the sheet metal used in the transducer core.

2. Magneto-elastic transducer for measuring forces, which transducer comprises a laminated core of magnetostrictive sheet metal with tubular channels basically at right angles to the laminations, an excitation winding connected to an alternating current source and a measuring winding connected to a voltage sensitive device, said windings being mounted in said channels, the sheet metal of said core possessing permanent residual stresses at least in the areas of the laminations where the major part of the magneto-motive force impressed by the excitation current is expended, said stresses forming a laminar pattern consisting of stresses substantially of one sign in the surface layers of the sheet metal and stresses substantially of opposite sign in the middle layer, the stress changing character gradually in intermediate layers, the average magnitude of the stresses across the thickness of the sheet in any part of such areas being of the same order as the average magnitude of the residual stresses caused close to the punched edge when punching holes in soft-annealed sheet metal of the same thickness and basic composition as the sheet metal used in the transducer core.

3. Magneto elastic transducer according to claim 2, in which stresses are superimposed upon said laminar stress pattern, randomly distributed in magnitude sign and direction, said randomly distributed stresses contributing to the average stress magnitude defined in claim 2.

4. Magneto-elastic transducer for measuring forces, which transducer comprises a laminated core of magnetostrictive sheet metal with tubular channels basically at right angles to the laminations, an excitation winding connected to an alternating current source and a measuring winding connected to a voltage sensitive device, said windings being mounted in said channels, the sheet metal of said core possessing permanent residual stresses at least in the areas of the laminations where the major part of the magneto-motive force impressed by the excitation current is expended, said stresses being randomly distributed in magnitude, sign and direction, their average magnitude in any part of such areas corresponding to an average microstrain level of at least 0.1 percent, when measured through the line-broadening effect caused by the micro-strains to X-ray diffraction lines, using the integral breadth method, cu-$\alpha$-radiation, and correcting for line broadening due to instrumental effects and the doublet radiation.

* * * * *